United States Patent [19]

Al-Tabaqchali et al.

[11] Patent Number: 4,547,526

[45] Date of Patent: * Oct. 15, 1985

[54] FLAME PROTECTION COMPOSITION COMPRISING ALUMINUM TRIHYDRATE, ORGANIC BINDER, AND A SULFUR COMPOUND AND A POLYURETHANE FOAM PROVIDED WITH SUCH FLAME-PROTECTION COMPOSITION

[76] Inventors: Manhal Al-Tabaqchali, Kurt-Lindemannstr. 25, D-6903 Neckargemünd; Ludwig Wesch, Görresstrasse 54, D-6900 Heidelberg; Edgar Weiss, Am Stangenberg 37, D-6901 Neckarsteinach, all of Fed. Rep. of Germany

[*] Notice: The portion of the term of this patent subsequent to Jun. 19, 2001 has been disclaimed.

[21] Appl. No.: 611,714

[22] Filed: May 18, 1984

Related U.S. Application Data

[63] Continuation of Ser. No. 330,695, Dec. 14, 1981, Pat. No. 4,455,396.

[30] Foreign Application Priority Data

Dec. 18, 1980 [DE] Fed. Rep. of Germany ....... 3047823

[51] Int. Cl.$^4$ .............................................. C08L 33/08
[52] U.S. Cl. .................. 521/54; 204/159.16; 428/72; 428/160; 428/423.1; 521/55; 524/157; 524/159; 524/169; 524/392
[58] Field of Search ............... 521/54, 55; 524/157, 524/159, 169, 392; 428/72, 160, 423.1; 204/159.16; 330/695

[56] References Cited

U.S. PATENT DOCUMENTS 4,093,589  6/1978  Factor et al. ..................... 524/159
4,224,374  9/1980  Priest ..................... 521/54

FOREIGN PATENT DOCUMENTS 0002458  11/1978  Fed. Rep. of Germany .
0011211  11/1979  Fed. Rep. of Germany .

OTHER PUBLICATIONS

Journal of Cellular Plastics, P. V. Bonsignore, May/-Jun., 1979, pp. 163–179.
Ternay, *Contemporary Organic Chemistry* W. B. Saunders, Philadelphia, 1979, Table 24-1 & p. 1019.
*Chem. Abstr.* 56, 1962, p. 9/N.
Hawley (ed), *The Condensed Chemical Dictionary,* 9th Ed., Van Nostrand, NY, 1977, p. 824.

*Primary Examiner*—Maurice J. Welsh
*Attorney, Agent, or Firm*—Hopgood, Calimafde, Kalil, Blaustein & Judlowe

[57] ABSTRACT

In order to improve the flame-protection effect without substantially impairing the mechanical properties of the articles covered with the flame protection agent, the flame protection agent is provided with a compound in a proportion by weight of 7.5 to 30% which contains at least one sulfo group or sulfonium ion. This compound is preferably a water-soluble ammonium salt. As binder there is used an aqueous solution or aqueous dispersion of an organic material, particularly of an acrylate or of a polymer or copolymer having a base of acrylic acid ester. It is particularly advantageous if substantially open-cell polyurethane foam having a base of polyether is impregnated with such a flame-protection agent which contains an ammonium salt of an aminosulfonic acid in a proportion of about 12%. Polyurethane foams impregnated in this manner are particularly well suited for use in cushionings of articles or in premises for which class B1 fire protection is required.

21 Claims, 6 Drawing Figures

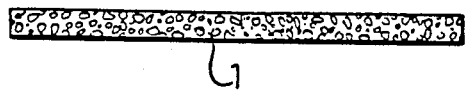
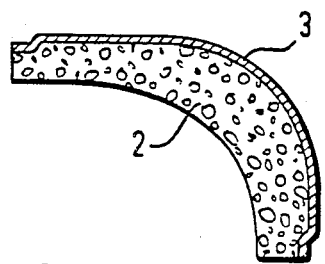
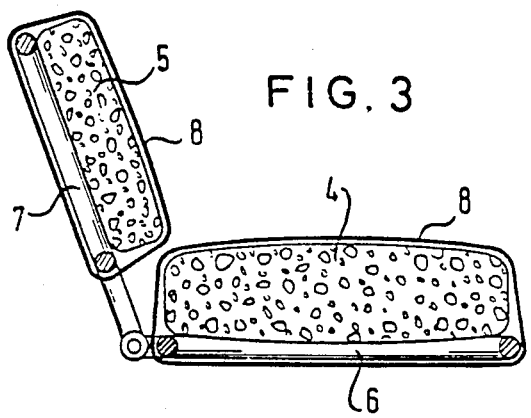
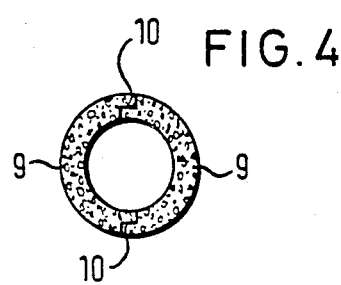
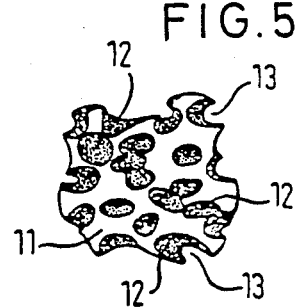
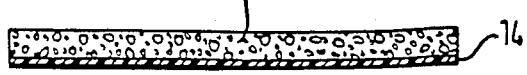

FLAME PROTECTION COMPOSITION COMPRISING ALUMINUM TRIHYDRATE, ORGANIC BINDER, AND A SULFUR COMPOUND AND A POLYURETHANE FOAM PROVIDED WITH SUCH FLAME-PROTECTION COMPOSITION

CROSS REFERENCE TO RELATED APPLICATIONS

This application is a continuation of Ser. No. 330,695 which was filed on Dec. 14, 1981, now U.S. Pat. No. 4,455,396.

The present invention relates to fire and flame protection and refers to a flame protection agent which serves for the treatment of inflammable objects and to a method of manufacturing a difficultly inflammable polyurethane foam having a base of polyether as well as an article of such kind.

Porous articles, for instance foams, are characterized not only by a number of advantages which make them particularly suitable as building materials and as fillers, but in particular also by the disadvantage that in the event of the occurrence of a fire they easily ignite or decompose, physically or chemically, in such a manner that they can lead to secondary fires. This is particularly true of foams having a base of polyurethane, rubber, PVC and polystyrene, as well as their copolymers.

In order to reduce the danger of fire, smoldering or re-ignition, it is already known (West German Unexamined Applications for Patent OS Nos. 27 54 313 and 28 56 081) to introduce polychloroprene latex, aluminum hydroxide, zinc and magnesium oxides, alkyl phenol trichloride and pentabromtoluene. In this connection, the elastomeric polychloroprene latex containing carboxyl groups is applied together with zinc and magnesium oxides and other cross-linking agents to the polyurethane-foam by spraying, pouring, spreading, dipping, impregnating etc. and cross-linked. Other cross-linkable elastomers, such as polybutadiene, polyisoprene and ABS (acrylonitrile-butadiene-styrene) polymers are also in this connection. The life of the foam, particularly in the case of incident light, the smolder behavior and the thickness of foam layer which is flame-resistant have, however, not been satisfactory. Thus, up to now it has not been possible satifactorily to prevent a merely incompletely carbonized structure of the foam from remaining in the case of fire, and continuing to carbonize and smolder and at some time form a new focus of fire.

It is therefore also known (West German Unexamined Applications for Pat. OS No. 28 11 951 and as 25 12 345, West German Provisional Pat. AS Nos. 14 94 929, AS 14 94 899 and AS 21 12 005, Austrian Pat. No. 351 773 and British Pat. No. 1 066 330) to mix the flame protection agent with the starting materials even before the production of the foam or of plastic laminates, boards and similar articles and to integrate it, as far as possible as reactant, as integral component in the final plastic. In addition to problems of manufacturing technique, poor mechanical properties are however, obtained in the case of foams.

The object of the present invention is to create a flame protection agent which can be applied even subsequently to inflammable objects and which, despite an improved flame protection effect, does not substantially impair the mechanical properties of the bodies treated, including in particular open-cell foams.

The various embodiments of the invention are characterized in the claims.

The present invention provides, in one aspect, a flame protection composition for the treatment of inflammable articles. This composition comprises up to about 50% by weight of the total composition of aluminum trihydrate in an organic binder and a sulfur compound which has at least one sulfo group and/or sulfonium ions in a proportion of between 7.5 and 30% by weight based upon the weight of the total composition.

The preferred sulfonium multiple bonding has the object, in contradistinction to the action of cross-linking agents in the prior art, to contribute effectively to the flame-protection effect. Thus the sulfonium ions may also be sulfonium zwitter ions. A combination with an ammonium compound is particularly advantageous, in particular an ammonium salt of a sulfonic acid in a proportion of about 12% of impregnating agent.

By means of the flame protection agents of the invention, open-cell polyurethane foams in particular (especially those derived from polyether) can be made flame resistant. The fire or flame protection agent covers the outwardly open surface parts, in particular also in the open cell pores, and impacts high resistance in fire, burning and/or flame to the foam. Furthermore it has been found that a foam which has been impregnated with the agent disintegrates into small particles or microparticles at the high temperatures present in fires so that re-igniting or smoldering is not possible.

Such covering is possible in the case of all types of bodies and particularly porous bodies, as well, however, as in the case of films, which, even after coating with the flame protection agent, can be combined to form laminates.

If foam, and particularly polyurethane non-rigid foam having a base of polyether, is provided with the flame-protection agent it is advisable to employ the impregnation method. Surprisingly it has been found that the flame protection agent of the invention permits good impregnation of foam articles of a layer thickness of up to about 50 mm, which affords far better protection than polyurethane foams impregnated only to a depth of 20 mm. For this purpose an aqueous solution or dispersion, particularly an emulsion, of an organic binder is preferably employed. In addition to acrylates, polymers having a base of vinyl acetate and aqueous epoxy-resin emulsions as well as copolymers of acrylic acid esters and acrylonitrile and furthermore Mowiliths such as polyphenylacetate and mixtures of such binders particularly recommend themselves.

Even in case of double impregnation, which provides an absorption of so much flame protection agent that the unit weight of the foam is increased from about 20 kg/m$^3$ to 6.5 times this value, the mechanical properties which are of importance for the character of the foam are not substantially impaired. Thus the memory effect remains large and the susceptibility to tears or even pulverization upon dynamic stressing does not increase even after lengthy UV irradiation. This is an advantage presumably also upon the selection of the binder, particularly the acrylates, in a particular percentage of flame protection agent. In contradistinction to the use of foams provided with polychloroprene or similar latex, the resistance to aging of acrylate-impregnated polyurethane foams is substantially better, although few pigments or other anti-aging agents are used; they remain elastic much longer. This is important in particular for those foams which are used for upholstering purposes, such as seat cushions, mattresses, and carseats, but also for the shock-absorbent cushioning of vehicle parts.

Insofar as foams provided with flame protection agents are used as acoustic and heatinsulating wall parts of buildings, vehicles and the like, it is advisable, in accordance with a further development of the invention, to cover the foam with an additional difficulty inflammable protective layer, at least on one side thereof. This layer can be applied by spraying and finds good anchoring in the open cells on the outside of the foam. It is preferably formed of an aqueous epoxy-resin emulsion provided with hardeners and additives or filling agents which at high temperatures react endothermally, form foam, give off gas and/or interrupt molecular chains.

When carrying out the method of the invention it is advisable for
1. the foam to be completely impregnated.
2. the surface stresses and pH values of the impregnation bath to be so adjusted that the flame protection agent i.e. the impregnation bath, adheres well in a uniform thickness of layer to the form and the bond strength is so permanent. even upon compressive stressing or dynamic loading that substantially no scaling takes place, and
3. the hardness of the foam not to be substantially affected.

Examples of particularly suitable impregnation baths and flame protection agents are indicated below. (The percentages are percentages by weight of the flame-protection or impregnation agent).

EXAMPLE 1

| Acrylat KA 8158 55% | 20% |
| --- | --- |
| Water | 31.2% |
| Martinal V 100 - C | 37.5% |
| Feliderm DR | 8% |
| Antimony trioxide | 2% |
| Helio Fast | 0.3% |
| Baysilon Defoamer E | 0.4% |
| Ammonia 25% | 0.2% |
| Mirox AM 25% | 0.4% |

The impregnation bath is adjusted in such a way as to establish the following values:

| Viscosity | 200 mPa |
| --- | --- |
| Solids content | 58-59% |
| pH | 7-8 |
| Density: | 1.416 |

Acrylat K 8158 is an acrylic-acid ester copolymer manufactured by Bayer AG having a polymer content of 55%. In place thereof, Acronal (a polyacrylic ester of BASF) or some other solution or aqueous dispersion of an organic binder such as Mowilith DC 20 F (PVAC of Hoechst) can also be used.

Martinal V 100-C is an aluminum trihydrate produced by Martinswerke of Cologne. Instead of it, Giludral AGL 73 (manufactured by the Giuliniwerke of Ludwigshafen) or 1 APYRAL can also be used. Feliderm DR is an ammonium salt of amino-imido-sulfonic acid manufactured by Hoeschst AG.

The antimony trioxide should have a density of 5.2.

Baysilon is a silicone oil emulsion, for instance polysiloxane methyl ether.

Mirox AM is an acrylic acid with acrylic ester manufactured by Chem. Fabrik Stockhausen of Krefeld and serves to increase the dispersion.

A polyether foam having a weight of about 20 kg/m$^3$ is introduced and submerged in an impregnation bath corresponding to Example 1 so as to obtain a thorough impregnation of the open-cell foam. After the impregnation, the foam has a unit weight of about 100 kg/m$^3$.

Drying is then effected in a stream of warm air. However, drying with the use of high frequency in a microwave oven is particularly preferred. In this connection it is surprising that, in contradistinction to impregnated foams which have already been proposed, the foam used and impregnated in accordance with the above Example 1 retains practically completely all its properties after the drying in the microwave field but is characterized by excellent "resistance to fire"

The following properties have been determined:

| | |
| --- | --- |
| Temperature Resistance | stable between −50 and +150° C. |
| Odor | no odor |
| Color | all colors |
| Solids | 58-59% |
| Release of HCl | none |
| Adjustment of degree of softness | by variation of the binder |
| Resistance to ultra violet and infrared | resistant |
| Flue gases upon burning | slight |
| Glowing | disappears upon removal of the flame |
| Fastness to laundering | excellent |
| Apparent density | 18 ± −2 kg/m$^3$ |
| Compression stress value in accordance with DIN 5357 | 40% |
| Tensile strength in accordance with DIN 53571 | 70 kPa |
| Elongation at break | at least 180% |
| Compression set | 10% |
| Indentation or compression hardness value in accordance with DIN 53576 at 40% deformation | 2.3 kPa |

EXAMPLE 2

| Acrylat KA 8158 55% | 20% |
| --- | --- |
| Water | 31.3% |
| Martinal V100 - C | 32.6% |
| Feliderm K | 8% |
| Bromkal 73-6 DC | 2% |
| Antimonytrioxide | 5% |
| Helio Fast yellow | 0.3% |
| Baysilon Defoamer E | 0.2% |
| Ammonia 25% | 0.2% |
| Mirox AM 25% | 0.4% |

Bromkal 73-6 DC is a product of the Chemische Fabrik Kalk, Cologne, having a base of pentabromtoluene with a content of about 73% bromine. In place thereof, Bromkal 48-4 BA of 1,2-bis-(2,4,6 tribromphenoxy)-ethane of Velsicol Chemical Corp. of Chicago can be used.

Feliderm K is the trade name used by Hoeschst AG for ammonium salt of aminosulphonic acid.

For further improvement of the flame protection effect in a fire region of high temperature it is advisable to cover the foam which already has been pre-impregnated for instance in accordance with Example 1 with a second layer by the impregnation process; in this case, the unit weight of the foam after the second impregnation can increase to 150 kg/m³.

The double impregnation method is possible either with the impregnation bath of Example 1 or the impregnation bath of Example 2 or else alternately with both impregnation baths.

The impregnation bath of Example 2 is directed at an impregnation which provides flame protection even at lower temperatures. The decomposition temperature of Pentabromtolene is 280° C., so that it is possible to use substances which have a lower decomposition temperature. Surprisingly, it has been found that particularly favorable effects are obtained with the use of (1,2,5,6,9,10)-hexabromcylododecane. This agent decomposes at only 170° C. and a rapid extinguishing effect can be obtained together with fine-grain aluminium trihydrate and antimony trioxide.

As bromine compounds, mixtures of brominated diphenylethers and/or brominated diphenylene, such as nonabromdiphenyl can also be used.

As sulphur compounds there enter into consideration compounds of or with sulfone and/or sulfonium zwitter ions, and particular ammonium salts and related compounds of the following sulphonic acids which give optimum results in combination with the acrylate impregnation bath: amino-, amido-,imido-, 2-chlor-4-toluidin- and 2-chlor-4-toluidin-5-sulphonic acids. Nitramine Acid SF (3 amino-2 hydroxy-5 nitrobenzene sulphonic acid) is also suitable.

Further examples are diphenylsulfone and di-(4 hydroxyphenylsulfone, and, with the use of epoxy resin in particular diaminophenylsulfone.

Thus it has been found that a considerable advance is obtained if only polyurethane foams are used as foams and substantially only aluminium trihydrate together with an ammonium salt of an amino-sulphonic acid are employed as fire extinguishing or flame repellent material. In this way there is surprisingly obtained a good combined effect and it has been found that no smoldering is present any longer and that all mechanical properties are retained after impregnation.

EXAMPLE 3

| 1. Acronal 810 | 15% |
| 2. Water | 30.2% |
| 3. Martinal ON 313 | 38% |
| 4. Feliderm K | 12% |
| 5. Titanium dioxide | 3% |
| 6. Baysilon | 0.4% |
| 7. Helioe Fast | 0.4% |

Acronal 810 is a polyacrylic acid ester manufactured by BASF. in its place, acrylic acid esters with acrylonitrile and polyphenylacetate in a mixture ratio of between 1:1 and 5:1 can also be used. Martinal ON 313 is an aluminum trihydrate manufactured by Martinswerke of Cologne. Feliderm K is the trade name for ammonium salt of amino-sulphonic acid manufactured by Hoeschst AG.

The individual components may vary in their percentage, for instance:

| Martinal between | 30-50% |
| Feliderm between | 7.5-15% |
| Acronal 810 between | 10-20% |

Instead of Feliderm K, Feliderm DR can also be used, Feliderm DR is the trade name for ammonium salts of a mixture of amido-sulfonic and imido-sulfonic acids along with other ingredients, manufactured by Hoeschst AG.

The impregnation bath is adjusted in such a manner that the following values are established:

| Viscosity: | 650 mPa/sec |
| Solids contents: | 62% |
| pH: | 7–8% |
| Density: | 1,45 |

Except for the pH, deviations in the values upon testing the foam structure of up to ±10% are permissible.

The following properties were found on dried foam:

| Tensile strength in accordance with DIN 53571: | 131 kPa |
| Elongation in accordance with DIN 53571: | 196% |
| Compression stress value in accordance with DIN 53577 with 40% deformation: | 3.3 KPa |

The quality of the fire-protected foam reaches Class B1 in accordance with DIN 4102 and even better.

Summarizing, it may therefore be noted that the impregnation substance of Example 2 is active at even lower temperatures than the fire or flame protection agent of the of the impregnation bath of Example 1 and that Example 3 leads to the best results, particularly also with respect to the elimination of the danger of continued smoldering.

Depending on the specific use it may be desirable to use various bromine-containing substances in order to obtain graded flame protection, i.e. good flame protection in different temperature ranges. In this case it is advisable, in particular in order to prevent surface fires by smoldering or continued smoldering, if the fire or flame protection agent also contains nitrogen and/or phosphorus-containing components which decompose in particular at temperatures at which the bromine compounds also tend to decompose.

Guanidines such as benzoguanidine resin, emlamine borate, dimelamine pyrophosphate of secondary guanidine phosphates, guanylurea and other water-soluble ammonia compounds have proven particularly suitable in this connection. The best effect is obtained when 10–20% of the phosphorus or nitrogen-containing substances are added to the impregnation bath of Examples 1–3.

The numerical values indicated in the specification and particularly in the examples are essentially average values; thus favorable properties are to be expected even if they are not adhered to.

The fire protection values correspond to DIN 4102, Part 1, at least Class B1. In fire-shaft furnaces fire protection values have been obtained which considerably exceed those of the foams available on the market which have good fire and flame protection properties. Residual lengths of more than 150 mm are thereby obtained.

The invention is applied with particular advantage to foam inserts which are used in particular for seats and mattresses. This is of importance in particular in railways, streetcars, subways, buses, automotive vehicles and airplanes where rapid propagation of fires is to be prevented.

In addition to this, the invention can be employed to advantage in those foams which are used for heat and/or sound insulation in the form of insulating layers, in particular as boards, as well however as tubes, wrappings, or the like. Thus walls and ceilings of buildings, particularly wooden structures and makeshift shelters, as well however as vehicles, can be equipped or lined with foam layers or foam boards which are impregnated with the fire or flame protection agent of the invention.

Illustrative examples are described below with reference to the drawing in which:

FIG. 1 is a diagrammatic cross section through a building board consisting of foam;

FIG. 2 is a diagrammatic cross section through a padding produced with the use of foam, for instance for the instrument panel of an automotive vehicle;

FIG. 3 is a diagrammatic cross section through a seat provided with foam inserts;

FIG. 4 is a diagrammatic cross section through a foam pipe covering, consisting of two parts;

FIG. 5 is an enlarged diagrammatic partial section through the structure of the foam which has at least partially open cells; and FIG. 6 is a diagrammatic cross section through a sandwich construction part consisting of a layer of foam and a cover layer.

The building board shown in FIG. 1 consists of open-cell polyurethane foam having a base of polyether which is merely indicated by open-cell dots. Such building boards serve in particular for heat/cold and/or acoustic insulating coverings for outer walls or partition walls in buildings, but can, however, also be used themselves as such walls.

FIG. 2 shows diagrammatically in cross section an instrument-panel padding of foam which is covered on the outer side with a covering 3, for instance a grained plastic layer, corresponding to the interior covering an automotive vehicle. The actual foam element also consists of open-cell polyurethane (polyether) foam.

FIG. 3 shows two foam inserts 4 and 5 on a seat 6 and a back 7 (which have been merely diagrammatically shown), covered by tensioning straps or a cover material 8. In this case also the foam inserts consist of predominantly open-cell foam.

In FIG. 4, two semi-circular half shells 9 consist of foam of open-cell type. Pipelines can be covered by such foam shells 9 and be insulated against cold or heat as well as against reverberation of sound. Both half shells 9 are provided with grooves 10 so that they can be fitted together to form a tube.

In FIG. 5 the open-cell foam structure 11 of the parts 1,2,4,5,9 shown as FIGS. 1 to 4 are developed in the manner that the cells 13 and connecting channels of the porous structure 11 consisting of polyurethane (with a base of polyether) are covered with the covering 12 which remains after the drying of the impregnating agent. This assures the desired protection against fire and smoldering. In this connection it is advisable for this covering material which serves as fire or flame protection agent to decompose at temperatures between 100° and 350° C. In order to obtain a wide spectrum of such decomposition effects, the covering 12, which has merely been indicated in the drawing (produced from the impregnating agent after the drying thereof), is applied in several layers. The material of the individual layers of the covering 12 is so selected that the materials of different layers decompose at different temperatures.

In FIG. 6, the building board 1, which has a thickness of about 50 mm and consists of the polyurethane (polyether) foam impregnated with the flame protection agent is covered on one side with a cover layer 14 of a thickness of about 2 mm, the binder for the flame inhibiting components which develop gases, particularly water vapor, at high temperatures being formed of an aqueous epoxy resin emulsion with the use of hydrophilic and water-emulsifiable epoxy resins and, in particular, amine hardeners.

We claim:

1. Flame protection compositions for the complete impregnation of inflammable articles, comprising from 30% up to about 50% by weight of the total composition of aluminum trihydrate bound in an organic binder and a sulfur compound having at least one sulfo group and/or sulfonium ions in a proportion of between 7.5 and 30% by weight based upon the weight of the total composition.

2. The flame protection composition of claim 1 wherein a water-soluble ammonium compound is present in a proportion of between 5 and 20% by weight based upon the weight of the total composition.

3. The flame protection composition of claim 2 wherein said sulfo compound and said ammonium compound is an ammonium salt of a sulfonic acid in a proportion of the order of magnitude of 12%.

4. The flame protection composition of claims 1, 2, or 3 wherein said sulfo compound is one of the following:
   aminosulfonic acid
   amidosulfonic acid
   imidosulfonic acid
   2-chloro-4-toluidine sulfonic acid
   diphenyl sulfonic acid.

5. The flame protection composition of claims 1, 2, or 3 wherein said organic binder is in an aqueous solution and/or dispersion.

6. The flame protection composition of claim 5 wherein said organic binder comprises a proportion of 12 to 22% of a polymer or co-polymer produced by the polymerization of monomers selected from the group consisting of acrylic acid ester, acrylonitrile and acrylate.

7. The flame protection composition of claims 1, 2, or 3 wherein said composition comprises:
   29-50% aluminum trihydrate
   27-32% water
   10-22% acrylic acid ester polymer or copolymer
   7.5-15% ammonium salt of amino-sulfonic acid
   Up to 11% antimony trioxide
   Up to 5% titanium dioxide
   Up to 0.5% defoaming agent
   Up to 0.5% pigments
and has the following properties:
   pH: 7-8
   Solids content: 56-64%
   Viscosity: 550-750
   Density: 1.4-1.5.

8. A difficultly inflammable polyurethane foam derived from polyether and having a substantially open-cell porous structure and a unit weight of between about 10 and 50 kg per $m^3$ wherein said foam is completely impregnated with a flame protection composition comprising up to about 50% by weight of the total composition of aluminum trihydrate bound in an organic binder and a sulfur compound wherein said flame protection composition also constitutes a cover for the cell walls of said open cells of said porous foam structure and said cover contains a sulfo compound in a proportion of between 7.5% and 30% of said cover in the flowable impregnation-agent state before its application.

9. The polyurethane foam of claim 8 wherein said cover contains an ammonium salt of at least one sulfonic acid selected from the group consisting of amino-sulfonic acid, amido-sulfonic acid, imidosulfonic acid, 2-chloro-4-toluidine sulfonic acid, and diphenylsulfonic acid.

10. The polyurethane foam of claim 8 or 9 wherein said cover has a proportion of 12 to 22% by weight of the flame protection composition of a polymer or copolymer derived from acrylic-acid ester or an acrylate.

11. The polyurethane foam of claim 10 wherein a second cover layer is applied on said foam structure, said second cover being derived from an aqueous epoxy resin emulsion having approximately the following initial composition:
aqueous epoxy-resin emulsion consisting of water-emulsifiable hydrophilic epoxy resin with a hardener derived from at least one member selected from the group consisting of polyamines, polycarboxylic anhydride, polyamidoamines and dicyandiamide, and with endothermally reacting foam-forming, gas-liberating additives.

12. The method of manufacturing a difficultly inflammable polyurethane foam of claims 8 or 9 wherein said foam is completely impregnated with the flame protection composition and thereupon dried, and the foam is so strongly impregnated with the flame protection composition that the unit weight of the foam after drying is at least about 500% of the original unit weight prior to the impregnation.

13. The method of claim 12 wherein said foam is completely impregnated twice in a two-step process.

14. The method of claim 12 wherein said foam is dried in a high-frequency process by microwaves after impregnation.

15. The foam of claim 11 wherein said hardener contains chain-terminating additives.

16. The foam of claim 11 wherein said hardener contains fillers.

17. The method of claim 13 wherein said foam is dried in a high-frequency process by microwaves after impregnation.

18. The flame protection composition of claim 1 wherein said sulfo group compound is a sulfone.

19. The flame protection composition of claim 6 wherein said monomers are selected from the group consisting of acrylic acid and acrylic acid ester.

20. A difficultly inflammable polyurethane foam derived from polyether and having a substantially open-cell porous structure and a unit weight of between about 10 and 50 kg per m$^3$ wherein said foam is completely impregnated with a flame protection composition comprising from 30% up to about 50% by weight of the total composition of aluminum trihydrate bound in an organic binder and a sulfur compound wherein said flame protection composition also constitutes a cover for the cells walls of open cells of said porous foam structure and said cover contains a sulfo compound in a proportion of between 7.5% and 30% of said cover in the flowable impregnation-agent state before its application.

21. The method of manufacturing a difficultly inflammable polyurethane foam of claim 20 wherein said foam is completely impregnated with the flame protection composition and thereupon dried, and the foam is so strongly impregnated with the flame protection that the unit weight of the foam after drying is at least about 500% of the original unit weight prior to the impregnation

* * * * *